(12) United States Patent
Mari et al.

(10) Patent No.: US 8,782,375 B2
(45) Date of Patent: Jul. 15, 2014

(54) HASH-BASED MANAGING OF STORAGE IDENTIFIERS

(75) Inventors: Charles E. Mari, Wappingers Falls, NY (US); Harris M. Morgenstern, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/351,772

(22) Filed: Jan. 17, 2012

(65) Prior Publication Data

US 2013/0185536 A1    Jul. 18, 2013

(51) Int. Cl.
*G06F 12/00*    (2006.01)

(52) U.S. Cl.
USPC ........................................................ 711/216

(58) Field of Classification Search
None
See application file for complete search history.

(56) References Cited

U.S. PATENT DOCUMENTS

| | | |
|---|---|---|
| 7,107,396 B2 | 9/2006 | Factor et al. |
| 2003/0018689 A1 | 1/2003 | Ramakrishnan |
| 2004/0107227 A1 | 6/2004 | Michael |
| 2005/0240747 A1 | 10/2005 | Raut |
| 2009/0287901 A1 | 11/2009 | Abali et al. |
| 2011/0035565 A1 | 2/2011 | Barrall |

FOREIGN PATENT DOCUMENTS

WO    WO 2007/097581 A1    8/2007

OTHER PUBLICATIONS

Combined Search & Examination Report for GB Application No. 1300445.2, dated Jul. 16, 2013 (6 pgs.).
Maebe, Jonas et al., "Precise Detection of Memory Leaks," WODA Conference Proceedings, 7 pages (2004).
Larson, Per-Ake, et al., "Memory Allocation for Long-Running Server Applications," ISMM '98, 10 pages (Oct. 1998).
IBM Publication, "z/Architecture Principles of Operation", IBM Publication No. SA22-7832-08 (Aug. 2010).

*Primary Examiner* — Charles Rones
*Assistant Examiner* — Tian-Pong Chang
(74) *Attorney, Agent, or Firm* — William A. Kinnaman, Esq.; Kevin P. Radigan, Esq.; Heslin Rothenberg Farley & Mesiti P.C.

(57) ABSTRACT

Managing storage identifiers in a pool is facilitated by providing a hashing-based management protocol in association with a stack which accommodates storage identifiers of the pool. The hashing-based management protocol includes: based on a request, popping a storage identifier from the stack without evaluating for update of a hash link associated with the stack, potentially allowing the hash link to become inconsistent with storage identifiers remaining in the stack; and based on return of a freed storage identifier to the stack, hashing the freed storage identifier and identifying whether there is an inconsistency in the hash link related to return of the freed storage identifier, and based on identifying the inconsistency, one of updating the hash link to remove the inconsistency, or indicating, where ascertained, that the freed storage identifier is a duplicate storage identifier.

20 Claims, 15 Drawing Sheets

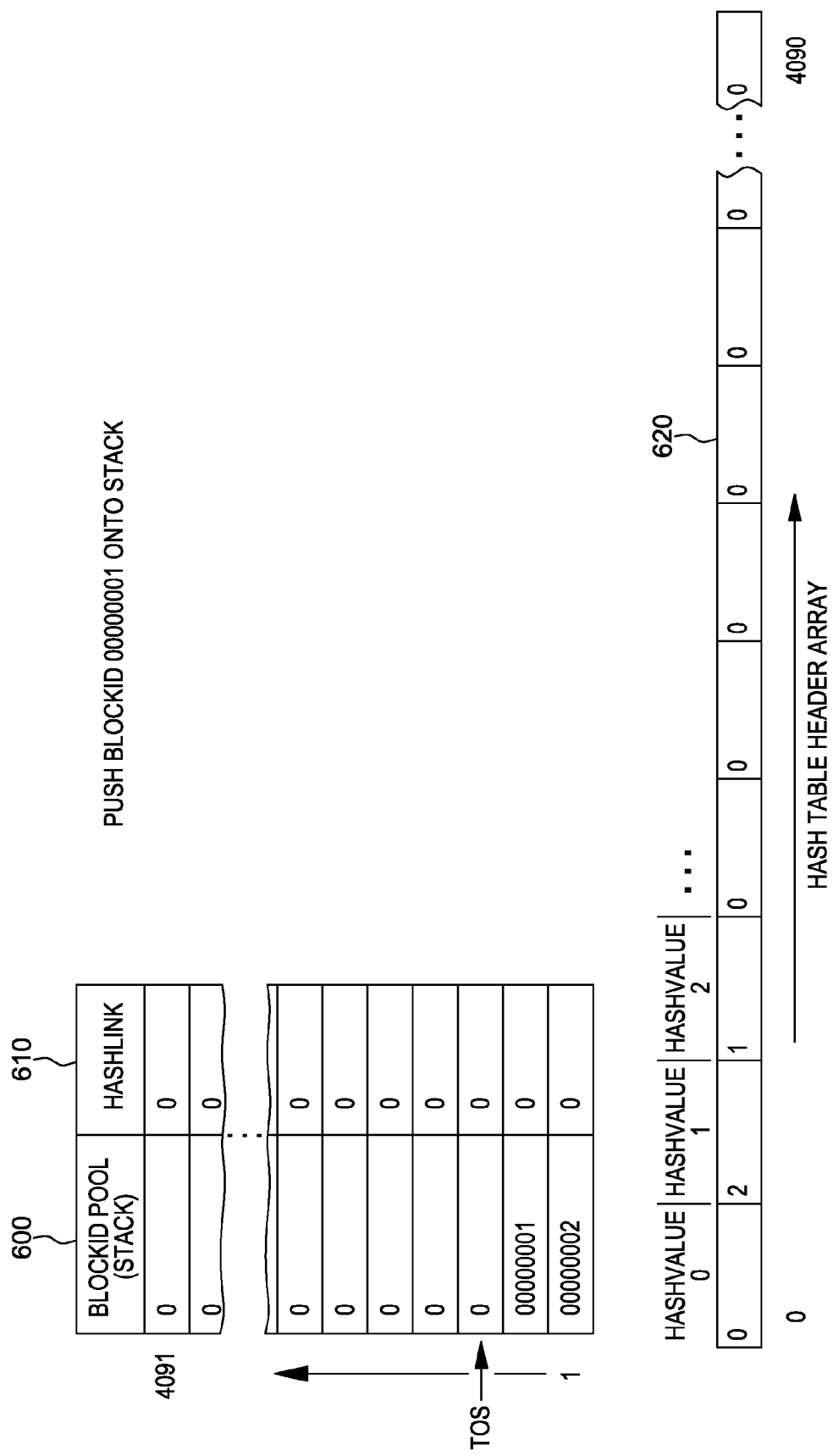

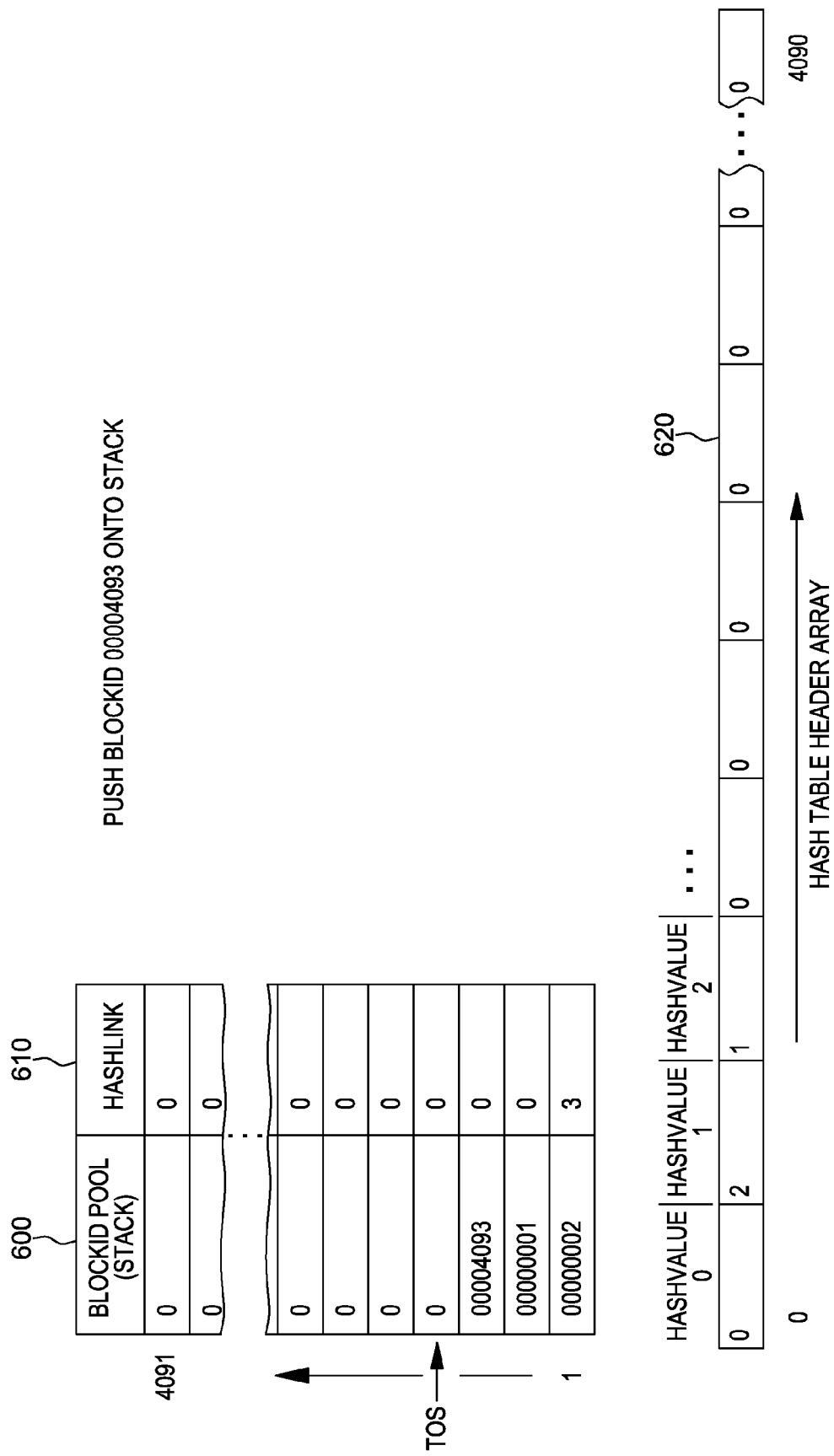

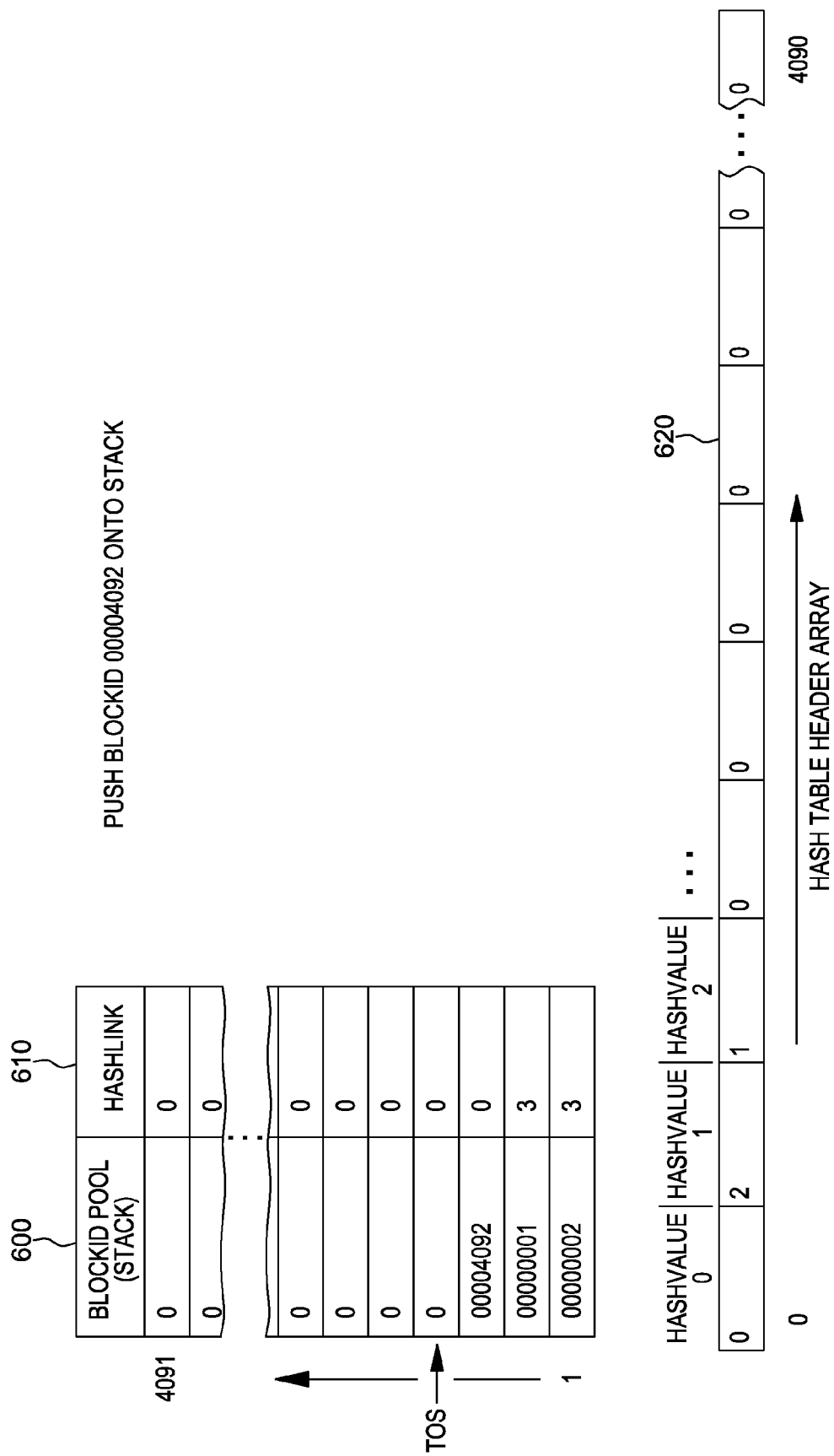

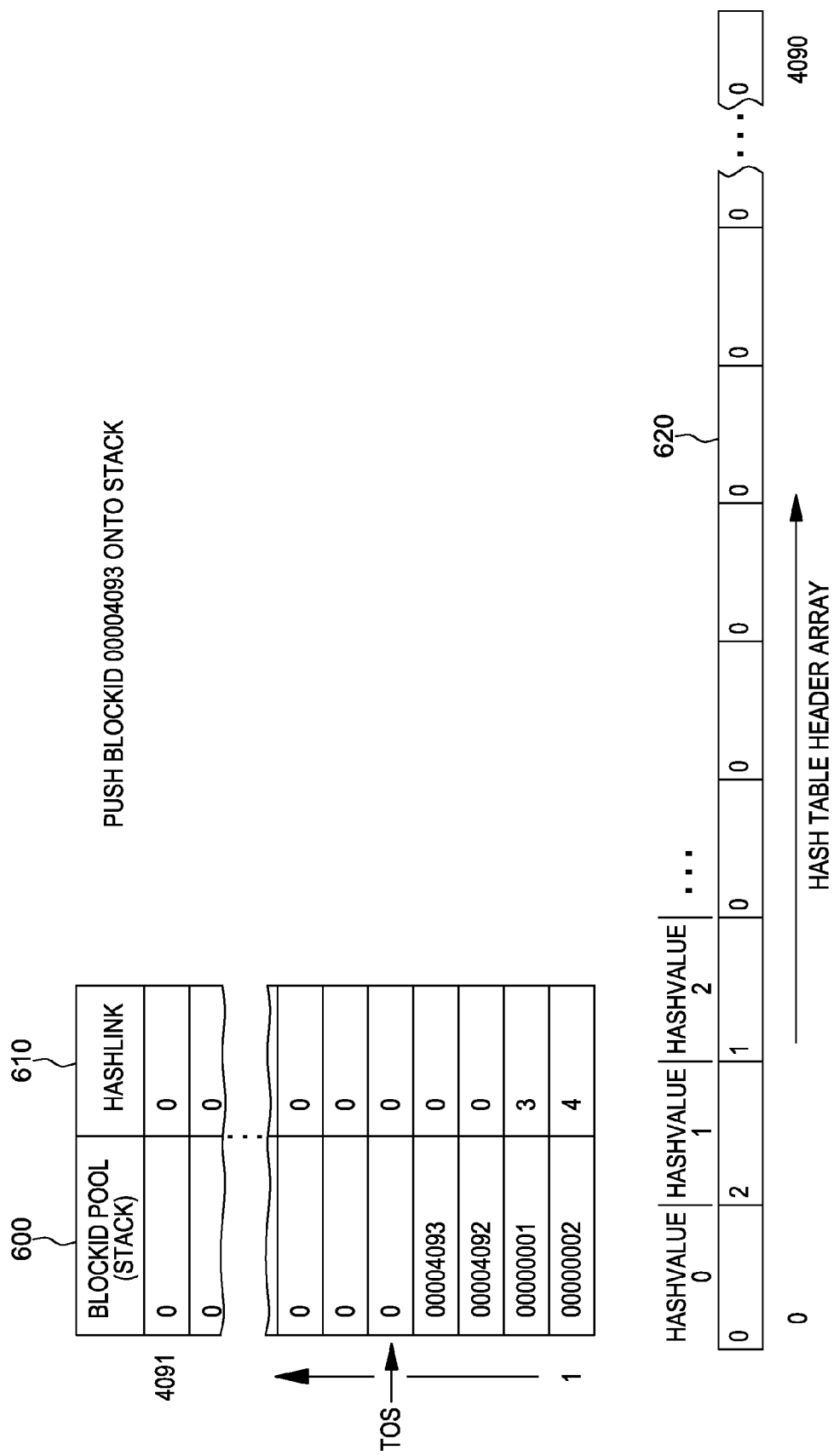

HASH-BASED MANAGING OF STORAGE IDENTIFIERS

BACKGROUND

One or more aspects of the present invention relate, in general, to managing auxiliary storage of a computing environment, and in particular, to managing storage identifiers of auxiliary storage of a computing environment.

A computing environment may include main memory, as well as auxiliary storage, such as direct access storage devices (DASD). Main memory includes pages of memory that are backed by real storage, referred to as real storage frames. These pages are ready to be accessed by applications, instructions, operations, or other entities. Main memory is limited in space, and therefore, typically only the most recently used pages of memory are maintained in main memory. Other pages of memory are maintained in auxiliary storage.

Auxiliary storage may include blocks of storage that are read and written. These blocks of storage are managed, including the allocation/deallocation of the blocks. In one example, the operating system tracks which blocks are currently being used and by what system components. This tracking is facilitated by the use of storage identifiers (or blockids) in association with the blocks of storage.

BRIEF SUMMARY

In one aspect, provided herein is a computer program product for managing storage identifiers in a pool. The computer program product includes a storage medium readable by a processing circuit and storing instructions for execution by the processing circuit for performing a method. The method includes, for instance, implementing a hashing-based management protocol in association with a stack accommodating storage identifiers of the pool, the hashing based management protocol comprising: based on a request, popping a storage identifier from the stack without evaluating for update a hash link associated with the stack, potentially allowing the hash link to become inconsistent with storage identifiers remaining in the stack; and based on return of a freed storage identifier to the stack, hashing the freed storage identifier and identifying whether there is an inconsistency in the hash link related to return of the freed storage identifier, and based on identifying the inconsistency, one of updating the hash link to remove the inconsistency, or indicating, where ascertained, that the freed storage identifier is a duplicate storage identifier.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6B depicts the structures and example of FIG. 6A, with return of another freed blockid to the stack utilizing a hashing-based management protocol such as depicted in FIGS. 4-5B, in accordance with one or more aspects of the present invention;

FIG. 6C depicts the structures and example of FIG. 6B, after return of another freed blockid to the stack utilizing a hashing-based management protocol such as depicted in FIGS. 4-5B, in accordance with one or more aspects of the present invention;

FIG. 6E depicts the structures and example of FIG. 6D, after return of a freed blockid to the stack utilizing a hashing-based management protocol such as depicted in FIGS. 4-5B, in accordance with one or more aspects of the present invention;

FIG. 6F depicts the structures and example of FIG. 6E, after return of another freed blockid to the stack utilizing a hashing-based management protocol such as depicted in FIGS. 4-5B, in accordance with one or more aspects of the present invention;

DETAILED DESCRIPTION

As explained below, disclosed herein is a management facility which addresses, at least in part, a specific problem associated with auxiliary storage management, namely, freeing of the same block of storage twice. Doing so is typically indicative of a data integrity problem, and it is imperative that such a data integrity problem be detected as soon as possible, to allow the operating system to gather diagnostic data and determine the root cause of the error. Disclosed herein is a hashing-based management protocol or facility which allows such errors to be detected in a way that minimizes performance impact on the underlining storage management approach.

Figure 1:
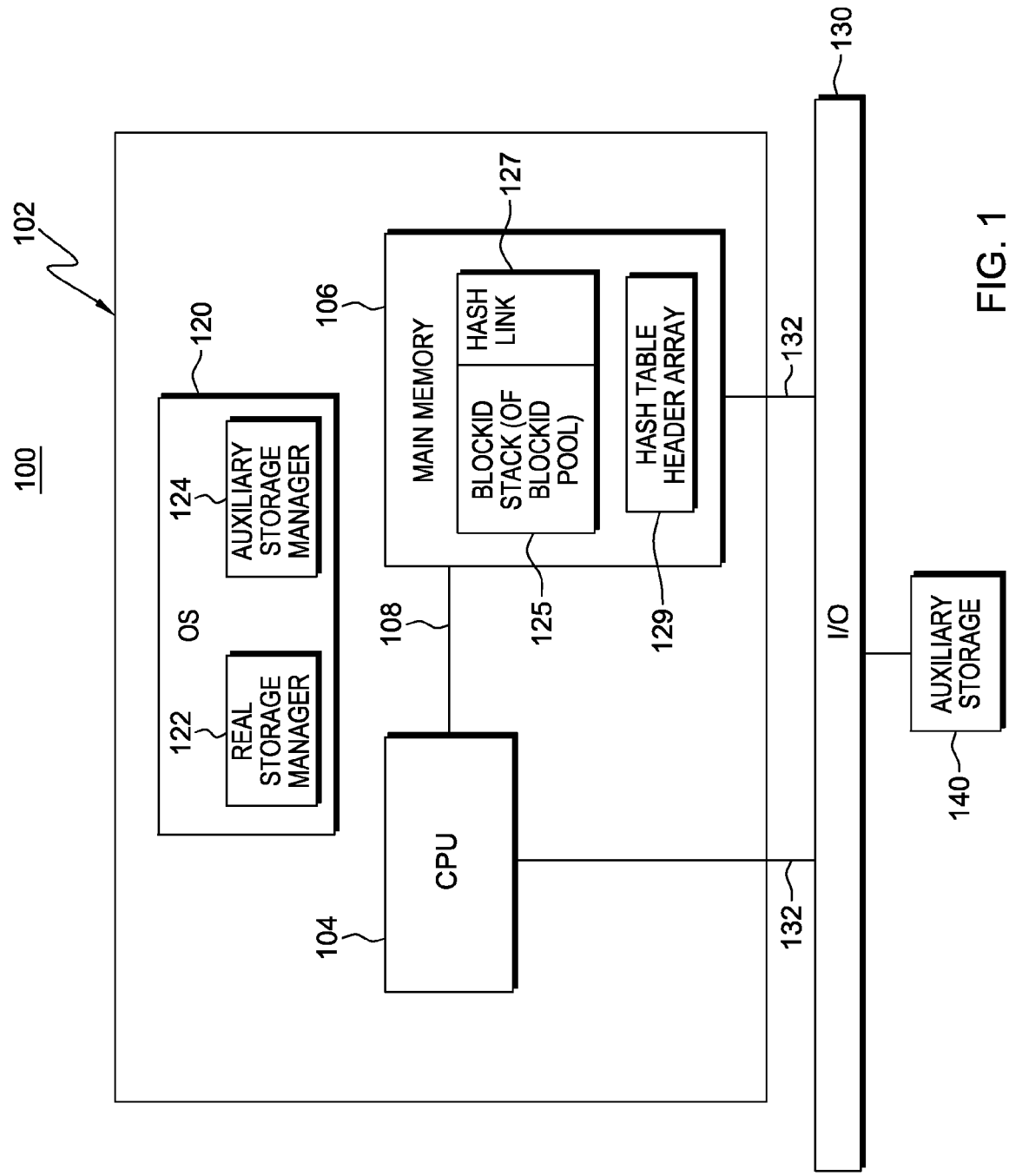
FIG. 1 depicts one example of a computing environment to incorporate and/or use one or more aspects of the present invention.

One embodiment of a computing environment to incorporate and/or use one or more aspects of the present invention is depicted in FIG. 1. Computing environment 100 may be based, for instance, on the z/Architecture® offered by International Business Machines Corporation, Armonk, N.Y. The z/Architecture® is described in an IBM® publication entitled, "z/Architecture Principles of Operation," IBM Publication No. SA22-7832-08, August 2010, which is hereby incorporated herein by reference in its entirety. In one example, a computing environment based on the z/Architecture® includes the zEnterprise 196 (z196) system, offered by International Business Machines Corporation, Armonk, N.Y. IBM® and z/Architecture® are registered trademarks, and zEnterprise 196 and z196 are trademarks of International Business Machines Corporation, Armonk, N.Y., USA. Other names used herein may be registered trademarks, trademarks or product names of International Business Machines Corporation or other companies.

As one example, computing environment 100 includes a system 102, such as one or more servers, a central processing complex, etc., that includes, for instance, one or more central processing units (CPUs) 104 coupled to main memory 106 via one or more buses 108. One of the central processing units 104 may execute an operating system 120, such as the z/OS® operating system offered by International Business Machines Corporation. In other examples, one or more of the central processing units may execute other operating systems or no operating system. z/OS® is a registered trademark of International Business Machines Corporation, Armonk, N.Y., USA.

Central processing unit(s) 104 and main memory 106 are further coupled to an I/O subsystem 130 via one or more connections 132 (e.g., buses or other connections). The I/O subsystem 130 provides connectivity to one or more auxiliary storage media 140, such as one or more direct access storage devices (DASDs). In one particular example of the z/Architecture®, the I/O subsystem is a channel subsystem. However, the I/O subsystem may be other than a channel subsystem, and the auxiliary storage media may be other than or in addition to DASD.

Main memory and auxiliary storage are managed, in one example, by managers of operating system 120, including, for instance, a real storage manager 122 and an auxiliary storage manager 124. Real storage manager 122 is responsible for tracking the contents of main memory and managing the paging activities of main memory. Auxiliary storage manager 124 is responsible for tracking auxiliary storage and for working with the real storage manager to find locations to store real pages that are being paged-out from main memory.

The auxiliary storage manager may manage various types of auxiliary storage. Further, in one embodiment, the auxiliary storage may be read or written in varying storage block sizes, including 4K and 1M storage blocks, as examples. The operating system (e.g., auxiliary storage manager) keeps track of the blocks currently being used, and by which system component(s).

Main memory 106 includes one or more memory pools. In one embodiment, a main memory pool may include a plurality of page frames of a particular size. For example, main memory 106 may include a plurality of memory pools, such as a 4K memory pool used to satisfy requests (e.g., from the operating system and applications) for 4K page memories (wherein a frame is the real memory backing the requested page); a fixed 1M memory pool used to satisfy requests for 1M fixed large page frames; a quad-area memory pool used to manage four, contiguous 4K frames in physical memory; or a pageable 1M memory pool used to service pageable 1M page frame requests.

Associated with one or more of the real memory pools may be one or more auxiliary storage pools, such as a 4K auxiliary storage identifier pool and a 1M auxiliary storage identifier pool, and each of which may reside within or comprise one or more stacks 125. Associated with each auxiliary storage identifier stack, in accordance with one or more aspects of the present invention, are various hashing-based structures, including a hash link 127 and a hash table header array 129. As explained further herein, hash link 127 comprises N entry positions corresponding to the N entry positions for storage identifiers in the stack 125. The hash table header array is associated with the stack and hash link, is indexed by hash values, and includes entry positions of the storage identifiers in the stack. The hash link indicates whether one or more collision chains exist, wherein each collision chain links two or more storage identifiers in the stack which hash to a common hash value. The hash value employed in hashing the storage identifier may vary. For example, in one embodiment, N=4091, the stack and hash link comprise 1 to 4091 entry positions, and the hash table header array comprises 0 to 4090 potential entries in the array. In one example, the hashing approach disclosed herein divides the blockid by N (e.g., 4091) and employs the remainder as the hash value used to ascertain whether (for example) the freed blockid is to be included in a collision chain of blockids with a common hash value.

Figure 2:
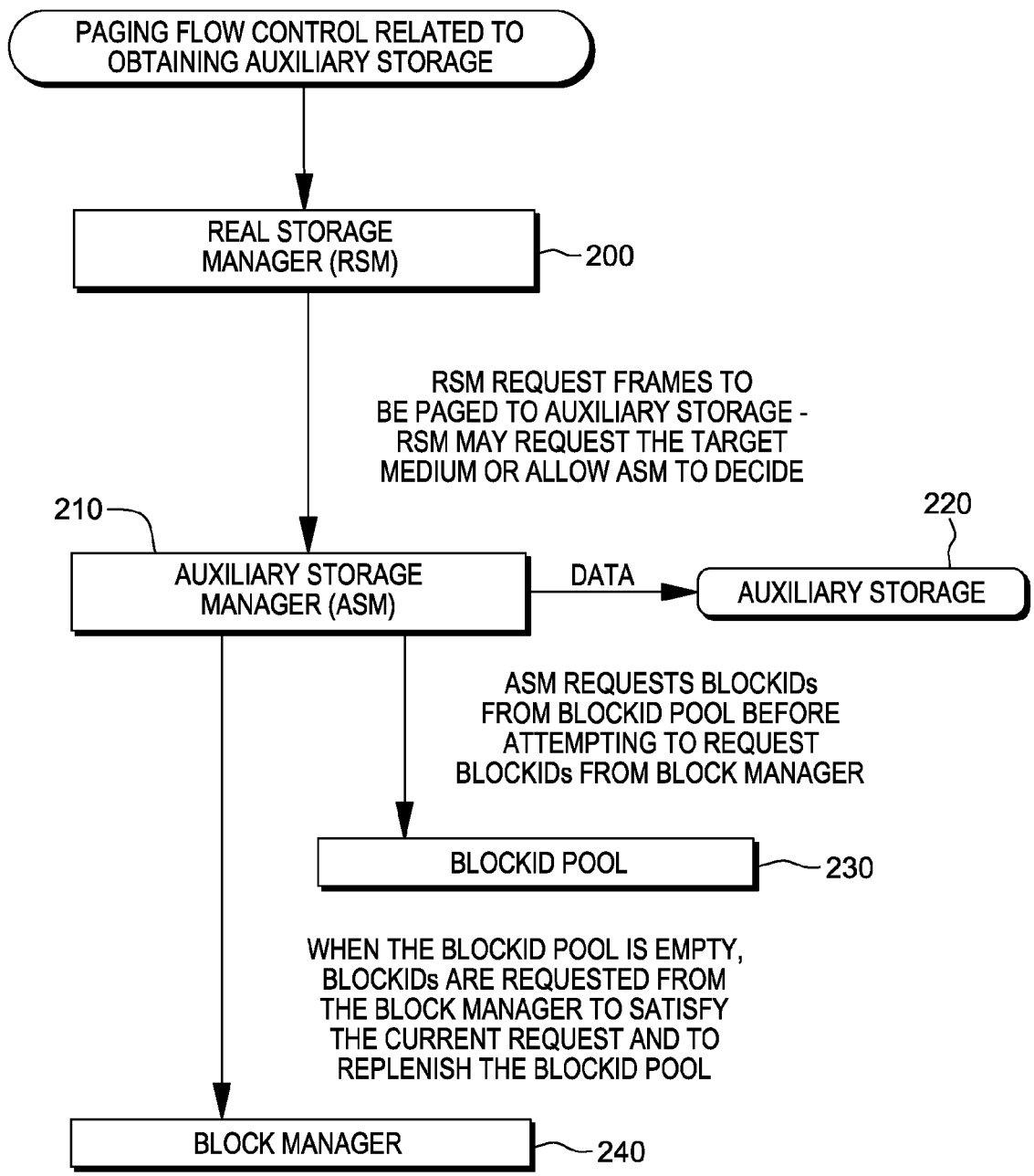
FIG. 2 depicts one embodiment of paging flow control within a computing environment (such as depicted in FIG. 1) for obtaining a blockid, and which is to incorporate and/or use one or more aspects of the present invention.

FIG. 2 depicts one embodiment of paging flow control logic for obtaining an auxiliary blockid, and which is to incorporate and/or use one or more aspects of the present invention. In this logic flow, the real storage manager 200 requests one or more frames to be paged to auxiliary storage 220. In doing so, the real storage manager may request a particular target medium, or allow the auxiliary storage manager 210 to select the medium. The auxiliary storage manager 210 controls transfer of data to the backing or auxiliary storage 220, such as to one or more direct access storage devices. When the real storage manager needs to page real storage out to auxiliary storage, the auxiliary storage manager initially requests one or more auxiliary storage identifiers (also referred to herein as blockids) from a blockid pool 230. If the blockid pool is empty, the auxiliary storage manager requests the blockid(s) from a block manager to satisfy the current request, and to replenish the blockid pool 240. The block manager manages auxiliary storage in, in one example, 4K and 1M blocks or storage units. Each block may be associated with a numeric ID, starting at zero. To track the usage of these blocks, the block manager employs sets of bitmaps to indicate whether a particular block is in use or free.

Figure 3:
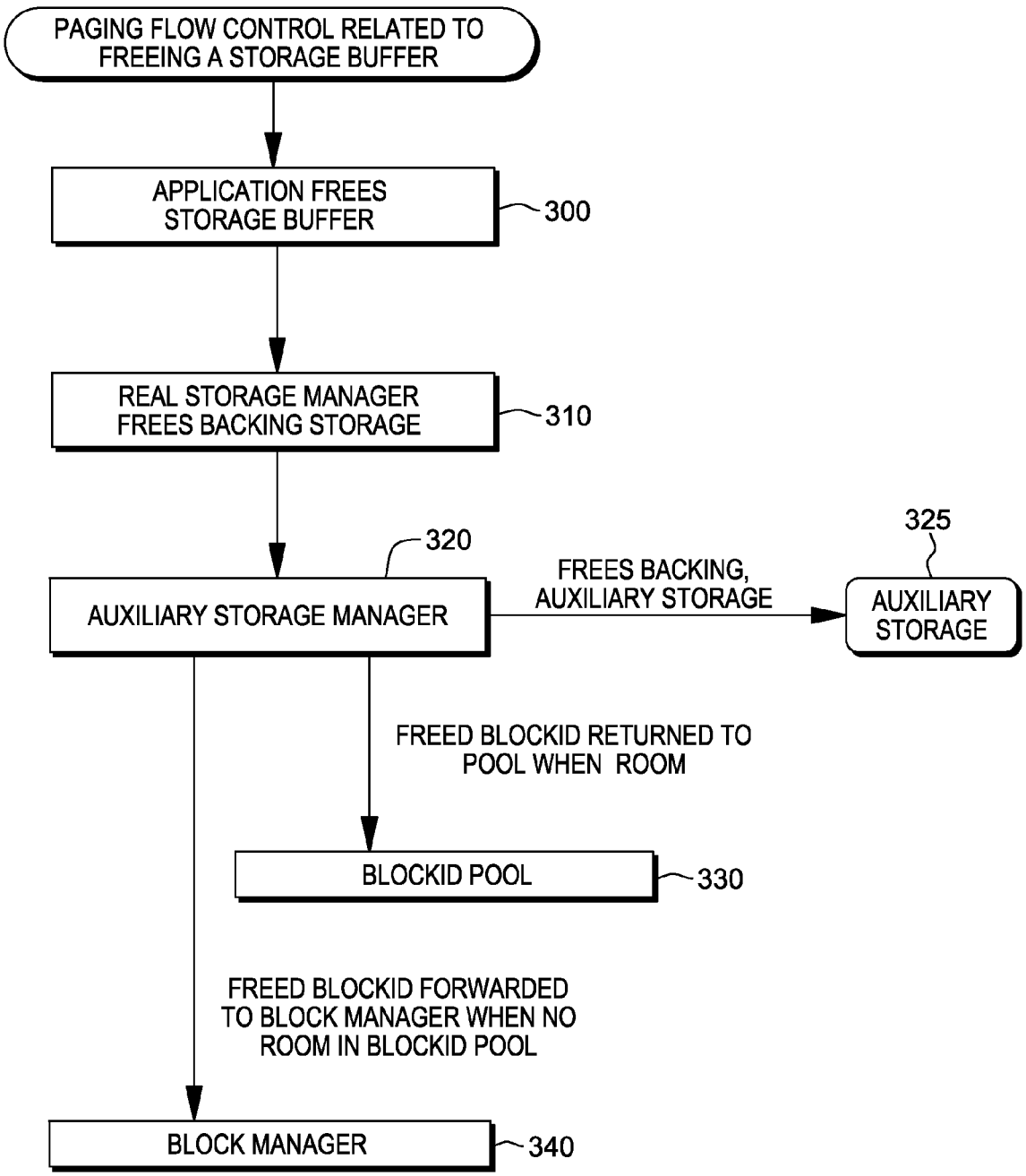
FIG. 3 depicts one embodiment of paging flow control within a computing environment (such as depicted in FIG. 1) when an application frees a storage buffer, and which is to incorporate and/or use one or more aspects of the present invention.

FIG. 3 depicts paging flow control logic when returning storage freed by an application 300, and which is to incorporate and/or use one or more aspects of the present invention. Note that the application frees real storage, but any backing or auxiliary storage related to that real storage must be freed as well. Based on freeing a real storage buffer by the application, the real storage manager frees the backing or auxiliary storage 310 by contacting the auxiliary storage manager 320 to free the respective auxiliary storage 325. The auxiliary storage manager frees the associated blockid to the blockid pool 330, or to the block manager when there is insufficient room in the blockid pool for the freed blockid 340.

Freeing a block (or blockid) twice indicates that the block was in use for two distinct purposes, and thus indicate a data integrity error. Therefore, these types of errors should be identified as soon as possible. Using bit vectors, this can be readily accomplished. The real storage manager, however, does not normally request auxiliary storage from its block manager component, but rather, refers to the auxiliary storage identifier pool (or blockid pool), separately maintained to optimize blockid delivery performance. This storage identifier (or blockid) cache effectively "front ends" the block manager. The blockid pool includes, in one embodiment, two stacks of blockids, one stack for 4K blockids, and another for 1M blockids. When a blockid is requested, it is satisfied by the blockid pool if a blockid is available, otherwise, the block manager is invoked to obtain a set of blockids to replenish the depleted pool. When blockids are freed, they are typically returned to the blockid pool, unless the pool is full, in which case they are returned to the block manager. Determining whether a blockid being freed already exists in a stack might typically require traversing all entries in the stack, while searching for the blockid that is about to be freed. Even though freeing blockids is less significant than obtaining blockids from a performance standpoint, it is still significant such that a linear scan of the stack is undesirable.

Figure 4:
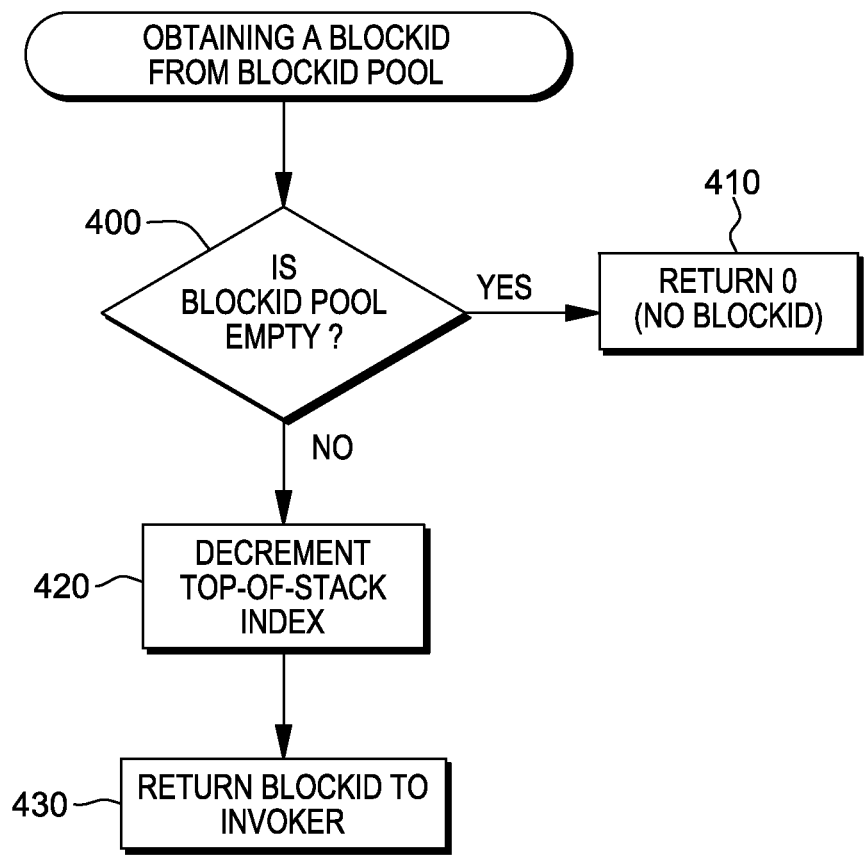
FIG. 4 depicts one embodiment of logic for obtaining a blockid from a blockid pool of a computing environment (such as depicted in FIG. 1) using a hashing-based management protocol, in accordance with one or more aspects of the present invention.

Thus, disclosed herein is an alternative approach, that is, a hashing-based management approach or protocol, that manages the one or more stacks of blockids or auxiliary storage identifiers used for paging, while monitoring for duplicate blockids and without significantly negatively impacting performance. In order to obtain optimum performance for the case where a blockid is obtained, the hashing-based protocol disclosed herein allows the associated hash link to be inconsistent with the storage identifiers remaining in the stack after popping a storage identifier from the stack. That is, a request for a storage identifier (or blockid) is satisfied in accordance with the hashing-based management protocol described herein without evaluating for update the hash link associated with the stack, potentially allowing the hash link to become inconsistent with the storage identifiers remaining in the stack. FIG. 4 depicts one embodiment of this obtaining protocol.

As illustrated in FIG. 4, obtaining a blockid from a blockid pool accessed by the auxiliary storage manager, includes inquiring whether the blockid pool is empty 400, and if "yes", then a blockid cannot be obtained 410, and the auxiliary storage manager requests assistance of the block manager (as noted above) to obtain the requested blockid(s). If the blockid pool is not empty, then the top-of-stack pointer (or index) is decremented 420 and the requested blockid is popped from the stack and returned to the caller of the service invoking the request for auxiliary storage 430. In one embodiment, popping a blockid from the stack for return to the invoker may leave identification of the blockid in the stack; and by decrementing the top-of-stack pointer, subsequently pushing a freed blockid onto the stack simply overwrites the stale blockid identification of the previously popped block. Note that no hashing related overhead is associated with obtaining a blockid from the blockid pool, in accordance with the management protocol disclosed herein. When one or more freed blockids are returned to the pool, the hashing protocol determines whether there is an inconsistency in the hash link related to return of the freed blockid, and based on identifying an inconsistency, either updates the hash link to remove the inconsistency, or indicates, where ascertained, that the freed blockid is a duplicate blockid. This approach advantageously imposes no performance penalty when obtaining a blockid from the blockid pool, potentially allowing the hash link associated with the stack to become inconsistent with the storage identifiers remaining in the stack, and imposes only a relatively small overhead when freeing a blockid for return back to the blockid pool.

Figure 5A:
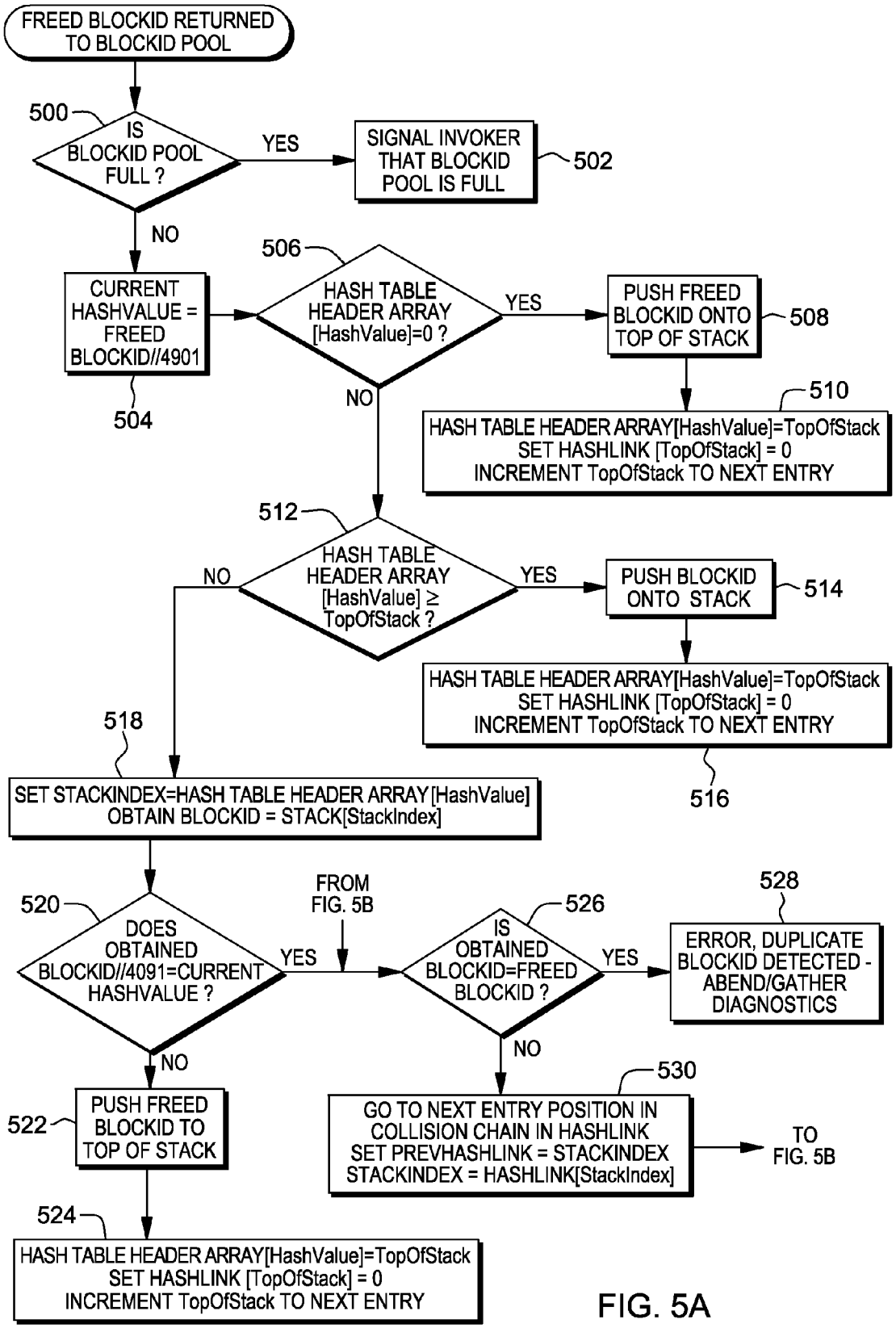
FIGS. 5A & 5B depict one embodiment of logic for returning a freed blockid to the blockid pool using a hashing-based management protocol, in accordance with one or more aspects of the present invention.
Figure 5B:
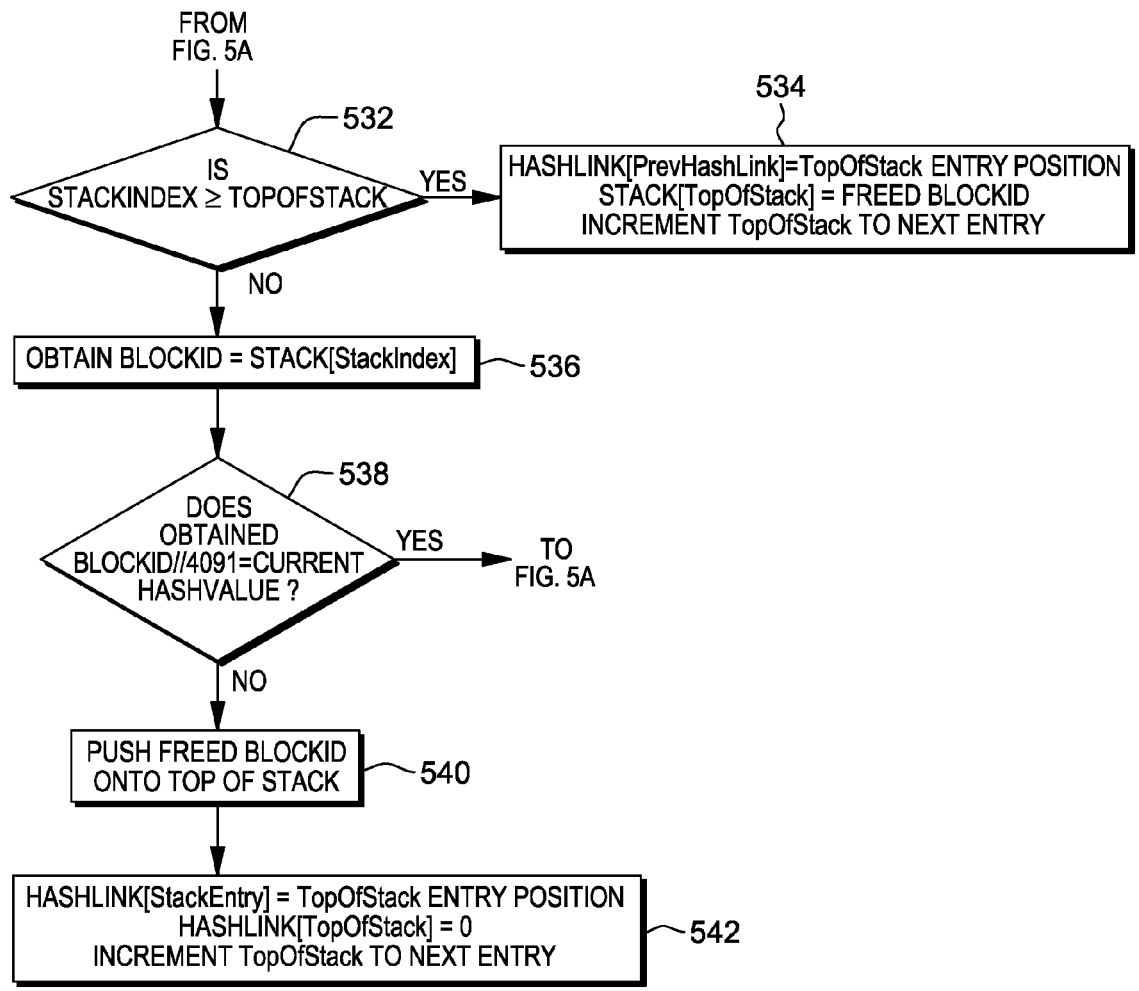

One embodiment of returning a freed blockid to the blockid pool employing a hashing-based management protocol in accordance with one or more aspects of the present invention is depicted in FIGS. 5A & 5B. Note that the example depicted in FIGS. 5A & 5B is one example only of the hashing-based management protocol disclosed herein.

As noted, the push or return protocol of FIGS. 5A & 5B is configured, in part, to correct the relevant portions of the hash link that an obtain or pop function may have made inconsistent. To that end, the return or push protocol obtains the hash value of the blockid, and if existing, a respective collision chain in the hash link, and addresses the following cases before adding the blockid to the top of the stack. Specifically, the protocol proceeds until: (1) the respective hash table entry contains a "zero", meaning that there is no hash collision between the blockid to be added and any other blockids, and thus, the blockid can be added to the top-of-stack; (2) the hash table or collision chain within the hash link points to an entry above the top-of-stack, in which case the blockid can be added to the top-of-stack, and any stale entries modified to point to the new top-of-stack; (3) the hash link points to an entry which is not on the current hash chain (but below the top-of-stack), and in this case, the prior hash link is adjusted to point to the entry about to be added (i.e., at the top-of-stack), and the freed blockid is added at the top-of-stack; (4) an entry on a collision chain within the hash link has the same blockid as the freed blockid about to be added, in which case, an error or duplication has been found, and the process is aborted; (5) otherwise, if there is a hash collision, the process is repeated with the next entry on the collision chain in the hash link. This protocol is explained further below with reference to the logic of FIGS. 5A & 5B.

Referring first to FIG. 5A, managing return of a freed blockid to the blockid pool includes determining whether the blockid pool is full 500, and if "yes", then the invoker (or auxiliary storage manager) is signaled that the blockid pool is full 502, in which case, the blockid will be returned to the block manager, as described above. Assuming that the blockid pool is not full, then the blockid is hashed to obtain a hash value 504. In one example, the hash value is obtained by dividing the blockid by a number N equal to the number of entry positions within the stack or hash link (as described above). As a specific example, this number might be 4091, and the hash table header array contains entry positions 0 to 4090 corresponding to the potential remainders obtained when the blockid is divided by 4091, as explained further in the examples provided below with reference to FIGS. 6A-6H.

Processing then determines whether the hash table header array for the obtained hash value is currently zero (or empty) 506. If so, the blockid is pushed onto the top-of-stack 508, the hash table header array is updated with the entry position for the top-of-stack, the hash link corresponding to that entry position is set to zero, and the top-of-stack pointer is incremented to the next entry 510. Note that the hash table header array locates the entry position of the blockid within the stack in this example. Advantageously, most of the time that a freed blockid is returned, this process flow path through the logic is followed.

If the hash table header array for the obtained hash value is other than zero 506, then processing determines whether the respective entry in the hash table is greater than or equal to the top-of-stack pointer 512, and if "yes", then the value in the hash table header array is stale, and refers to an entry that has been previously removed from the stack. In such a case, the freed blockid is pushed onto the stack 514, and the hash table header array is updated with the entry position of the added blockid, the hash link is updated with a zero in its corresponding entry position for the returning freed blockid, and the top-of-stack pointer is incremented 516.

Assuming that the current hash value obtained from hashing the freed blockid references in the hash table an entry position in the stack that is less than the top-of-stack pointer, then a stack index variable is set to the current hash value, and the blockid is obtained from the stack for that stack index, that is, the blockid in the stack that has the referenced hash table entry is obtained 518. Processing then hashes that blockid, and determines whether the result equals the current hash value 520. If "no", then the hash table has a stale entry, and the freed blockid is added to the top-of-stack 522, and the hash table header array is updated to point to the entry position of the freed blockid at the top-of-stack, the hash link is set with a zero value in the corresponding entry position, and the top-of-stack is incremented to the next entry 524.

If the obtained blockid divided by 4091 does equal the current hash value, then processing determines whether the obtained blockid equals the freed blockid being returned to the blockid pool 526. If "yes", then a duplicate error has been detected, and diagnostics are gathered to facilitate analysis of the duplication error 528, which terminates the return process. Otherwise, the freed blockid is different from the blockid referenced in the stack and a legitimate collision has been identified, that is, two blockids have been identified having a common hash value. In this case, a next entry in the corresponding collision chain in the hash link is obtained, the current stack index is saved, and the stack index is updated using the hash link field 530, after which processing determines whether, referencing the hash link exclusively, the stack index is above or equal to the top-of-stack pointer 532, as shown in FIG. 5B. If "yes", then a stale entry has been identified, and the hash link is updated to reference the top-of-stack, the freed blockid is inserted into the entry position at the top-of-stack, and the top-of-stack pointer is incremented 534.

Assuming that the stack index is below the current top-of-stack, then the corresponding blockid for that stack index is obtained 536, and that blockid divided by 4091 is compared against the current hash value 538. If they are equal, then the process returns to repeat until there are no further collisions identified in the collision chain. This logic is essentially working its way up the respective collision chain in the hash link until the collision chain refers to an entry position above or equal to the top-of-stack pointer, or refers to an entry that does not belong within the stack (that is, is stale) or a duplicate entry is identified. Assuming that the obtained blockid divided by 4091 is other than the current hash value 538, then the freed blockid is pushed onto the top-of-stack 540, and the hash link, or more particularly, the collision chain at issue, is updated to point to the entry position at the top-of-stack that the freed blockid was placed, the corresponding entry position in the hash link for that top-of-stack position is set to zero, and the top-of-stack pointer is incremented to point to the next entry 542.

FIGS. 6A-6H depict blockid management examples using the obtaining and returning protocols of FIGS. 4-5B.

Figure 6A:
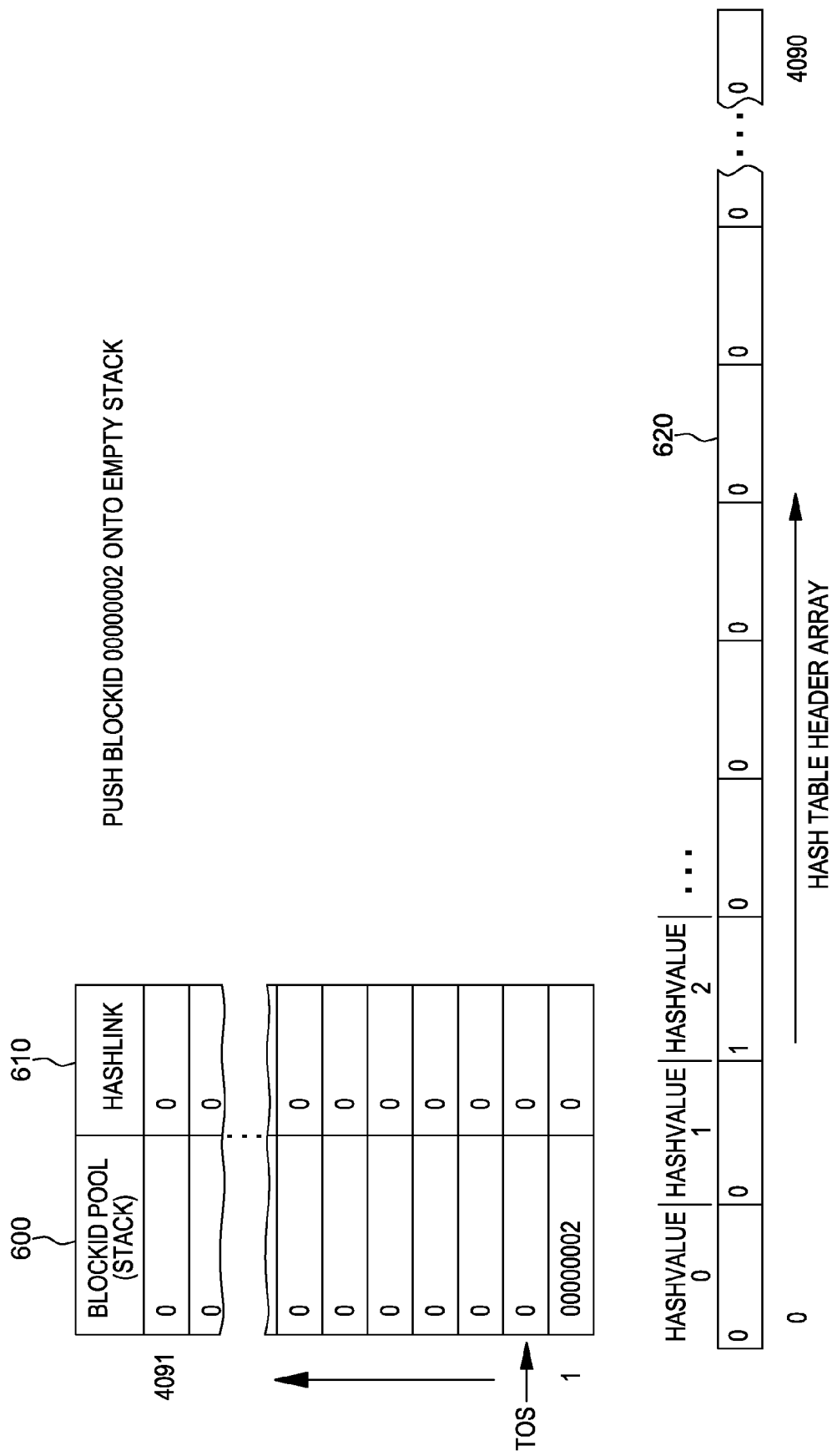
FIG. 6A depicts one embodiment of hashing-based structures and, by way of example, pushing a freed blockid onto a stack comprising blockids of a pool, in accordance with a hashing-based management protocol such as depicted in FIGS. 4-5B, and in accordance with one or more aspects of the present invention.

Referring to FIG. 6A, one embodiment of a stack 600 is illustrated comprising 1 to 4091 entry positions, each of which may comprise a blockid of a blockid pool such as described herein. Each entry position in the stack has a corresponding entry position in a hash link 610 associated with the stack. As explained herein, the hash link is provided to represent collision chains, each chain identifying multiple blockids in stack 600 that hash to a common hash value, without being duplicates of each other. Further, hash table header array 620 is provided as an index into the stack, and includes entry positions 0 to 4090, in the example provided herein. Thus, entry position 0 corresponds to a hash value (or a remainder value) of 0, entry position 1 corresponds to a hash value (or a reminder value) of 1, entry position 2 corresponds to a hash value of 2, etc. As noted, the hash value is obtained by dividing, in one example, the blockid by 4091, that is, the number of entry positions in the stack in this embodiment. In FIG. 6A, the stack, hash link and hash table header array are empty, except for one blockid, that is, blockid 00000002 disposed in entry position 1 within stack 600, and having a corresponding hash value of 2, which means that, within entry position 2 in hash table header array 620, a value "1" is placed as the index pointing to where in stack 600 blockid 00000002 is located. Note in this regard that 00000002 divided by 4091 equals a remainder (or hash value) of 2.

In FIG. 6B, another freed blockid, blockid 00000001, is returned to the stack and pushed onto the top of the stack at the top-of-stack pointer position identified in FIG. 6A. Note in this regard that, in this example, the top-of-stack pointer always points to the next free entry position in the stack. Blockid 00000001 divided by 4091 leaves a remainder 1, which indexes into the hash table header array 620 at the second entry position from the left, that is, at the "1" entry position. Within this entry position, the index 2 is placed, indicating that the blockid at issue is in entry position 2 within the stack. Note that the value in the hash link for both entry position 1 and entry position 2 remains at zero since there is no collision in hash values between the blockids currently in the stack.

In FIG. 6C, another freed blockid, blockid 00004093, is pushed onto the stack at the top-of-stack entry position identified in FIG. 6B by the top-of-stack pointer, that is, entry position "3" within the stack, as illustrated. Blockid 00004093 has a hash value of 2, which collides with blockid 00000002 at entry position 1 within the stack. Therefore, the protocol requires that checking be performed before adding the freed blockid 00004093 to the stack. The entry position of blockid 00000002 is entry position 1 in the stack, which is less than the top-of-stack, therefore, the hash values of blockid 00000002 and blockid 00004093 are evaluated and determined to be the same, and it is determined that the blockids themselves are different. Further, since the corresponding entry in the hash link is zero, blockid 00004093 is added to the top-of-stack, and a collision chain is created in the hash link between entry position 1 and entry position 3, that is, entry position 1 in the hash link points to entry position 3, meaning that the associated blockids 000000002 and 00004093 are related by the collision chain.

Figure 6D:
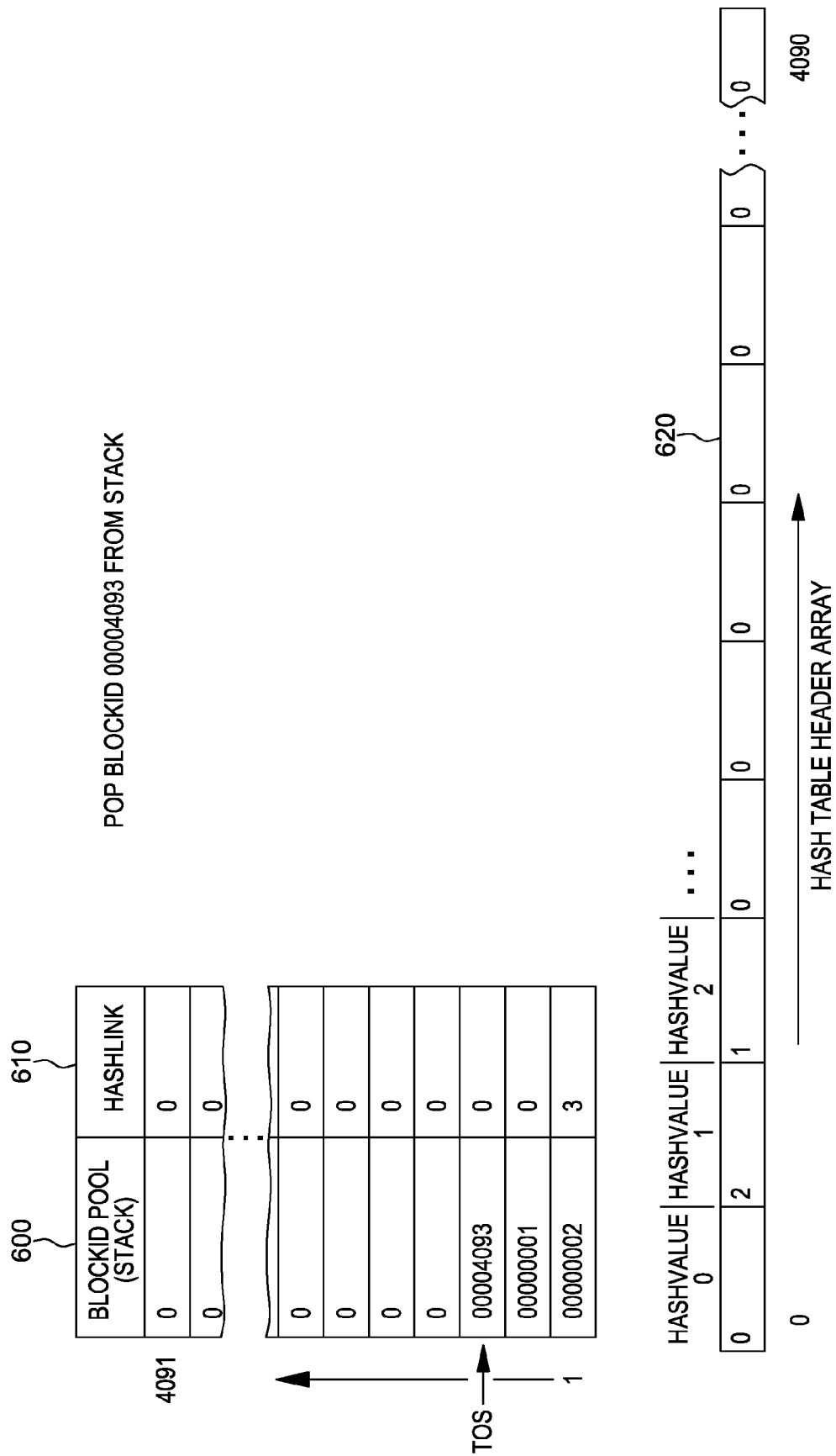
FIG. 6D depicts the structures and example of FIG. 6C, after obtaining a blockid from the stack utilizing a hashing-based management protocol such as depicted in FIGS. 4-5B, in accordance with one or more aspects of the present invention.

In FIG. 6D, a blockid is popped from the top-of-stack, which in this example means that the block represented by blockid 00004093 is removed. Note that popping the blockid from the top-of-stack simply means moving the top-of-stack pointer down one position, allowing the block/blockid to be freed, without updating the entry position in the stack following freeing of the blockid. As noted above, the top-of-stack pointer is assumed to point to the next free entry position in the stack. Thus, the value 00004093 in the example of FIG.

6D is a stale blockid entry in the stack, and may be overwritten (as illustrated in FIG. 6E) with pushing another blockid, for example, blockid 00004092 onto the stack at the entry position pointed to by the top-of-stack pointer of FIG. 6D.

Note in this example that pushing blockid 00004092 onto the stack includes determining an associated hash value of 1. The hash value of 1 indexes into the hash table header array at entry position "1", counting from the left position zero. As illustrated in FIG. 6E, entry position "1" in the hash table header array points to entry position 2 in the stack, that is, to blockid 00000001. Since blockid 00000001 and blockid 00004092 hash to the same hash value, a new collision chain is identified and the hash link is updated at entry position "2" with the number 3 to point to entry position "3" in the stack to correlate those two blockids. Note in this regard, that the 3 in entry position 1 of the hash link remains stale.

In FIG. 6F, another freed blockid 00004093 is pushed onto the stack. The protocol for managing this action follows that described above, except now the link in the hash link referenced in FIG. 6E for the blockid 00000002 having the same hash value points below the top-of-stack pointer entry position, so, according to the protocol, the blockid at entry position "3" is checked (i.e., blockid 00004092), and determined that it is not on the same collision chain as the newly freed blockid 00004093, and thus the new blockid 00004093 is added to the top-of-stack, and the hash link associated with blockid 00000002 collision chain is updated to point to entry position "4" in the stack.

Figure 6G:
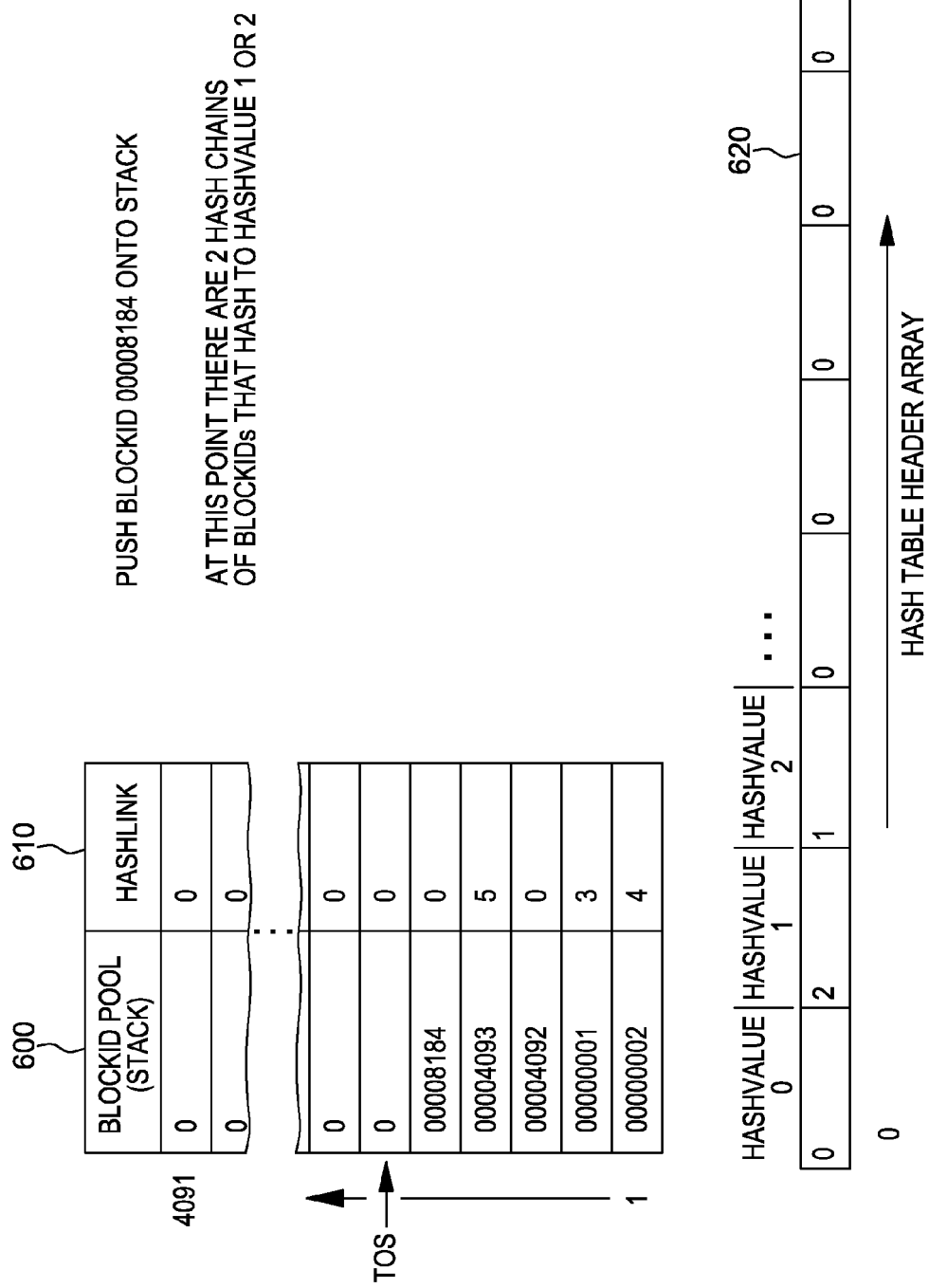
FIG. 6G depicts the structures and example of FIG. 6F, after return of a further freed blockid to the stack utilizing a hashing-based management protocol such as depicted in FIGS. 4-5B, in accordance with one or more aspects of the present invention.

In FIG. 6G, another freed blockid 00008184 is to be pushed onto the stack, and as noted above with respect to FIG. 6F, there are currently two collision chains identified in the hash link, that is, for blockids that hash to a hash value of 1 and blockids that hash to a hash value of 2. In pushing blockid 00008184 onto the stack, it is noted that blockid 00008184 hashes to the same value as blockid 0004093, so blockid 00008184 is added to the top-of-stack since the hash link identified in FIG. 6F corresponding to the fourth entry position, that is, the entry position containing blockid 00004093, is zero. Further, the respective collision chain is then updated by updating the value in hash link at this entry position to point to entry position "5", thereby chaining together, based on hash values, blockids 00000002, 00004093, and 00008184.

Figure 6H:
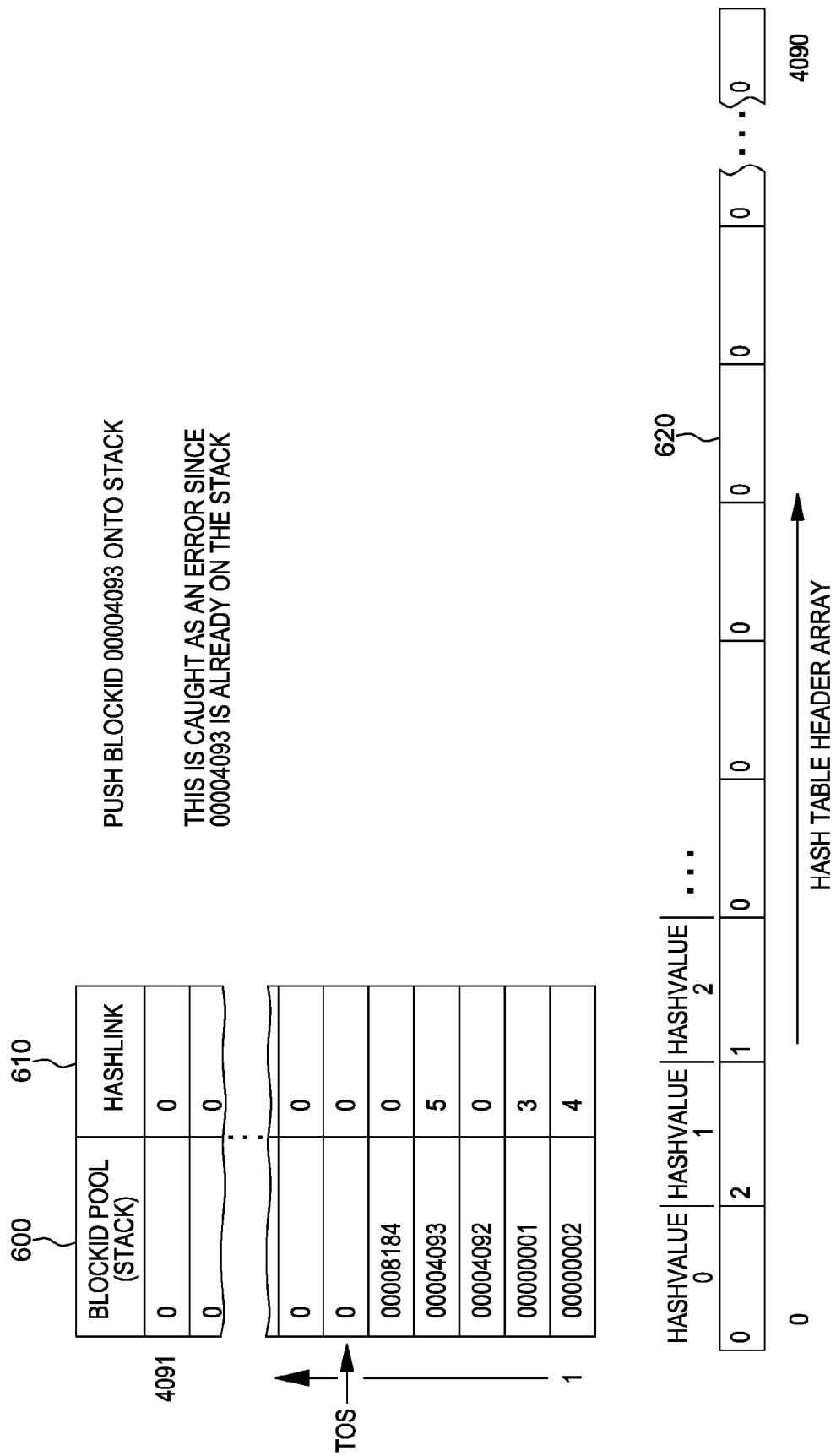
FIG. 6H depicts the structures and example of FIG. 6G, responsive to attempting to push a duplicate, freed blockid onto the stack utilizing a hashing-based management protocol such as depicted in FIGS. 4-5B, in accordance with one or more aspects of the present invention.

In FIG. 6H, an attempt is made to push block 00004093 onto the stack again, and this error is caught as a duplicate error, since 00004093 is already on the stack. By proceeding through the management protocol of FIGS. 5A & 5B, and noting that, since blockid 00004093 hashes to the same hash value as blockid 000000002, namely hash value 2, processing progresses through the respective collision chain until identifying that the blockid at entry position "4" in the stack is identical to the freed blockid to be added to the stack.

Note in the above example that blockids are provided in decimal, and assume a blockid pool size of 4090. Further, note that blockids may be implemented for a 4K auxiliary storage pool, or a 1M auxiliary storage pool, and that the hash function may simply be a remainder, of blockid/4091.

Note also that the protocol depicted in FIGS. 4-5B adds no performance overhead when obtaining a blockid from the pool, and a relatively small overhead when freeing a blockid for pushing back onto the pool. For completeness of checking, the freed blockid logic would also need to address: when the pool is full, the hashing search must still be performed to ensure that there are no duplicate freed blockids, even though it cannot be added to the blockid pool; and when the blockid is added to the blockid pool, the block manager must be queried to determine whether the block being added to the blockid pool is already freed from the block manager's perspective.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 7:
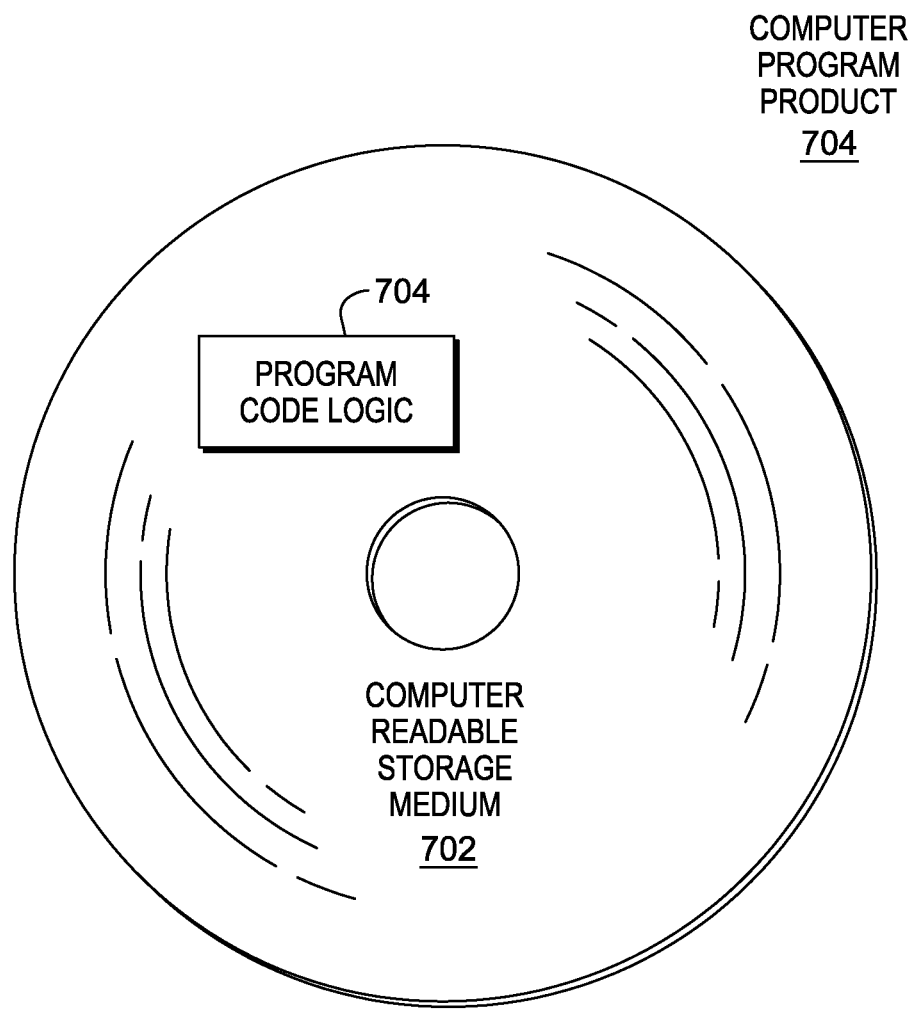
FIG. 7 depicts one embodiment of a computer program product to incorporate one or more aspects of the present invention.

Referring now to FIG. 7, in one example, a computer program product 700 includes, for instance, one or more non-transitory computer readable storage media 702 to store computer-readable program code means or logic 704 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, although examples of auxiliary storage are described herein, other types of auxiliary storage may be used without departing from the spirit of the present invention. Further, other considerations may be used to determine when or how to manage the large page pools. Further, pools other than large page pools may be managed, in accordance with an aspect of the present invention. Yet further, other threshold values and/or percentages may be used.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for managing storage identifiers in a pool, the computer program product comprising:
    a computer-readable storage medium readable by a processing circuit and storing instructions for execution by the processing circuit for performing a method comprising:
        implementing a hashing-based management protocol in association with a stack accommodating storage identifiers of the pool, the hashing-based management protocol comprising:
            based on a request, popping a storage identifier from the stack to create a freed storage identifier, wherein the storage identifier comprises a hash link that associates the storage identifier with the stack, and the popping occurs without evaluating the hash link for update; and
            based on a return of the freed storage identifier to the stack, hashing the freed storage identifier to obtain the hash link and identifying whether there is an inconsistency in the hash link and the storage identifiers remaining in the stack, and based on identifying the inconsistency, performing one of: updating the hash link to remove the inconsistency, or indicating that the freed storage identifier is a duplicate storage identifier.

2. The computer program product of claim 1, wherein the hash link comprises N entry positions corresponding to N entry positions for storage identifiers in the stack, and wherein the hashing-based management protocol further utilizes a hash table header array associated with the stack and hash link, the hash table header array being indexed by hash values and comprising entry positions of storage identifiers in the stack, and the hash link indicating whether one or more collision chains exist, each collision chain linking two or more storage identifiers in the stack which hash to a common hash value.

3. The computer program product of claim 2, wherein the stack, the hash link, and the hash table header array each comprise N entry positions, the stack and the hash link comprising entry positions 1 to N, and the hash table header array comprising entry positions 0 to N-1.

4. The computer program product of claim 2, wherein the hashing comprises obtaining a hash value for the freed storage identifier, and the identifying comprises utilizing the hash value of the freed storage identifier in determining whether there is the inconsistency in the hash link related to return of the freed storage identifier.

5. The computer program product of claim 4, wherein based on the freed storage identifier being identical to a storage identifier in the stack identified referencing a collision chain in the hash link reached using the hash value of the freed storage identifier and the hash table header array, indicating that the freed storage identifier is the duplicate storage identifier.

6. The computer program product of claim 4, further comprising determining whether an entry position in the hash table header array referenced by the hash value is empty, and based on determining that that entry position in the hash table header array is empty, pushing the freed storage identifier onto the stack, updating the hash table header array with the entry position of the freed storage identifier on the stack, and incrementing a top-of-stack pointer associated with the stack.

7. The computer program product of claim 6, further comprising, based on the entry position in the hash table header array referenced by the hash link being non-empty, determining whether that non-empty value in the hash table header array references a collision chain in the hash link with a stale entry at or above the top-of-stack pointer, and based on identifying the stale entry at or above the top-of-stack pointer, pushing the freed storage identifier onto the stack, updating the hash table header array with the entry position of the freed storage identifier on the stack, and incrementing the top-of-stack pointer associated with the stack.

8. The computer program product of claim 4, wherein the identifying further comprises determining whether for each entry in a collision chain in the hash link reached using the obtained hash value and the hash table header array, whether that entry is associated with an identical storage identifier as the freed storage identifier, and responsive to the freed storage identifier being different from each storage identifier associated with that collision chain of the hash link, pushing the freed storage identifier onto the stack, updating the collision chain in the hash link to include the entry position of the freed storage identifier in the stack, and incrementing a top-of-stack pointer associated with the stack.

9. A computer system for managing storage identifiers in a pool, the computer system comprising:
   a memory; and
   a processor in communications with the memory, wherein the computer system is configured to perform a method, the method comprising:
      implementing a hashing-based management protocol in association with a stack accommodating storage identifiers of the pool, the hashing-based management protocol comprising:
         based on a request, popping a storage identifier from the stack to create a freed storage identifier, wherein the storage identifier comprises a hash link that associates the storage identifier with the stack and the popping occurs without evaluating the hash link for update; and
         based on a return of the freed storage identifier to the stack, hashing the freed storage identifier to obtain the hash link and identifying whether there is an inconsistency in the hash link and the storage identifiers remaining in the stack, and based on identifying the inconsistency, performing one of: updating the hash link to remove the inconsistency, or indicating that the freed storage identifier is a duplicate storage identifier.

10. The computer system of claim 9, wherein the hash link comprises N entry positions corresponding to N entry positions for storage identifiers in the stack, and wherein the hashing-based management protocol further utilizes a hash table header array associated with the stack and hash link, the hash table header array being indexed by hash values and comprising entry positions of storage identifiers in the stack, and the hash link indicating whether one or more collision chains exist, each collision chain linking two or more storage identifiers in the stack which hash to a common hash value.

11. The computer system of claim 10, wherein the hashing comprises obtaining a hash value for the freed storage identifier, and the identifying comprises utilizing the hash value for the freed storage identifier in determining whether there is the inconsistency in the hash link related to return of the freed storage identifier.

12. The computer system of claim 11, wherein based on the freed storage identifier being identical to a storage identifier in the stack identified referencing a collision chain in the hash link reached using the hash value of the freed storage identifier and the hash table header array, indicating that the freed storage identifier is the duplicate storage identifier.

13. The computer system of claim 1 further comprising determining whether an entry position in the hash table header array referenced by the hash value is empty, and based on determining that that entry position in the hash table header array is empty, pushing the freed storage identifier onto the stack, updating the hash table header array associated with the stack with the entry position of the freed storage identifier on the stack, and incrementing a top-of-stack pointer associated with the stack.

14. The computer system of claim 13, further comprising, based on the entry position in the hash table header array referenced by the hash link being non-empty, determining whether that non-empty value in the hash table header array references a collision chain in the hash link with a stale entry at or above the top-of-stack pointer, and based on identifying the stale entry at or above the top-of-stack pointer, pushing the freed storage identifier onto the stack, updating the hash table header array with the entry position of the freed storage identifier on the stack, and incrementing the top-of-stack pointer associated with the stack.

15. The computer system of claim 11, wherein the identifying further comprises determining whether for each entry in a collision chain in the hash link reached using the obtained hash value and the hash table header array, whether that entry is associated with an identical storage identifier as the freed storage identifier, and responsive to the freed storage identifier being different from each storage identifier associated with that collision chain of the hash link, pushing the freed storage identifier onto the stack, updating the collision chain in the hash link to include the entry position of the freed storage identifier in the stack, and incrementing a top-of-stack pointer associated with the stack.

16. A method of managing storage identifiers in a pool, the method comprising:
   implementing a hashing-based management protocol in association with a stack accommodating storage identifiers of the pool, the hashing-based management protocol comprising:
      based on a request, popping a storage identifier from the stack to create a freed storage identifier, wherein the storage identifier comprises a hash link that associates the storage identifier with the stack, ansa the popping occurs without evaluating the hash link for update; and
      based on a return of the freed storage identifier to the stack, hashing the freed storage identifier to obtain the hash link and identifying whether there is an inconsistency in the hash link and the storage identifiers remaining in the stack, and based on identifying the inconsistency, performing one of: updating the hash link to remove the inconsistency, or indicating that the freed storage identifier is a duplicate storage identifier.

17. The method of claim 16, wherein the hash link comprises N entry positions corresponding to N entry positions for storage identifiers in the stack, and wherein the hashing-based management protocol further utilizes a hash table header array associated with the stack and hash link, the hash table header array being indexed by hash values and comprising entry positions of storage identifiers in the stack, and the hash link indicating whether one or more collision chains exist, each collision chain linking two or more storage identifiers in the stack which hash to a common hash value.

18. The method of claim 17, wherein the hashing comprises obtaining a hash value for the freed storage identifier, and the identifying comprises utilizing the hash value of the freed storage identifier in determining whether there is the inconsistency in the hash link related to return of the freed storage identifier.

19. The method of claim 18, wherein based on the freed storage identifier being identical to a storage identifier in the stack identified referencing a collision chain in the hash link reached using the hash value of the freed storage identifier and the hash table header array, indicating that the freed storage identifier is the duplicate storage identifier.

20. The method of claim 18, wherein the identifying further comprises determining whether for each entry in a collision chain in the hash link reached using the obtained hash value and the hash table header array, whether that entry is associated with an identical storage identifier as the freed storage identifier, and responsive to the freed storage identifier being different from each storage identifier associated with that collision chain of the hash link, pushing the freed storage identifier onto the stack, updating the collision chain in the hash link to include the entry position of the freed storage identifier in the stack, and incrementing a top-of-stack pointer associated with the stack.

* * * * *